United States Patent [19]
Kesinger

[11] Patent Number: 5,927,738
[45] Date of Patent: *Jul. 27, 1999

[54] BICYCLE SEAT SUSPENSION SYSTEM

[76] Inventor: Donald A. Kesinger, 8206 South Deer Creek Canyon Rd., Morrison, Colo. 80465

[ * ] Notice: Under 35 U.S.C. 154(b), the term of this patent shall be extended for 00 days.

[21] Appl. No.: 08/699,920

[22] Filed: Aug. 20, 1996

[51] Int. Cl.⁶ .................................................. B62M 1/00
[52] U.S. Cl. ........................... 280/220; 280/275; 280/283; 297/209
[58] Field of Search ..................................... 280/220, 283, 280/275, 226.1; 297/195.1, 208, 209, 199, 204, 211

[56] References Cited

U.S. PATENT DOCUMENTS

| | | |
|---|---|---|
| 575,152 | 1/1897 | Fogg . |
| 600,365 | 3/1898 | Hindmarsh . |
| 601,978 | 4/1898 | Nevill . |
| 602,354 | 4/1898 | Ohlgart . |
| 636,726 | 11/1899 | Hindmarsh . |
| 640,483 | 1/1900 | McKenzie . |
| 658,909 | 10/1900 | Fraser ...................................... 280/283 |
| 664,184 | 12/1900 | Stoll . |
| 686,156 | 11/1901 | Snyder . |
| 979,483 | 12/1910 | Harley . |
| 1,605,798 | 11/1926 | Crombrugge . |
| 2,623,573 | 12/1952 | Gaetano ................................... 280/283 |
| 2,982,536 | 5/1961 | Kordes . |
| 3,481,628 | 12/1969 | Brilando et al. ......................... 280/283 |
| 3,912,054 | 10/1975 | Fabre et al. . |
| 3,944,198 | 3/1976 | Sakamoto . |
| 3,982,770 | 9/1976 | Satoh et al. . |
| 3,989,263 | 11/1976 | Stuck et al. ............................. 280/283 |
| 4,182,508 | 1/1980 | Kallai et al. . |
| 4,275,922 | 6/1981 | Juy . |
| 4,421,357 | 12/1983 | Shimano . |
| 4,576,393 | 3/1986 | Moulton et al. . |
| 4,997,232 | 3/1991 | Johnsen . |
| 5,044,648 | 9/1991 | Knapp ..................................... 280/283 |
| 5,094,424 | 3/1992 | Hartway .................................. 280/220 |
| 5,269,549 | 12/1993 | Wilson et al. . |
| 5,344,170 | 9/1994 | Ochoa ..................................... 297/209 |
| 5,382,039 | 1/1995 | Hawker ................................... 280/220 |
| 5,704,626 | 1/1998 | Kesinger . |

FOREIGN PATENT DOCUMENTS

| | | |
|---|---|---|
| 885282 | 9/1943 | France ................................... 280/283 |
| 928951 | 6/1946 | France . |
| 2511289 | 9/1975 | Germany . |
| 3936342 | 5/1991 | Germany . |
| 421323 | 10/1946 | Italy . |
| 0610862 | 10/1960 | Italy . |
| 2-38196 | 2/1990 | Japan . |
| 301636 | 4/1997 | Taiwan . |
| 14225 | 8/1899 | United Kingdom . |
| 22845 | 12/1900 | United Kingdom . |
| WO 9015748 | 12/1990 | WIPO . |

OTHER PUBLICATIONS

"Suspension Seatpost Shootout" Apr. 1995, Mountain Bike Action Magazine, pp. 98–101, 106, 108.

"Answer Manitou EFC Suspension Fork", Apr. 1995, Mountain Bike Action Magazine, pp. 46 & 47.

"American Classic Titanium Seatpost", Spring 1995, Mountain Bike Action Accessory Guide, p. 70.

Primary Examiner—Daniel G. DePumpo
Attorney, Agent, or Firm—Holland & Hart LLP

[57] ABSTRACT

A seat suspension system for a bicycle comprises an outer generally elongate hollow tube and an inner generally elongate hollow tube telescopingly received within the outer tube. Ball bearing races are provided as by metal forming in the inner and outer tubes, and ball bearings are disposed in the races. The inner tube has an inner end fitted with a bushing such that the bushing is slidingly engaged with the outer tube. A compression spring is disposed between the inner end of the inner tube and a stop pin extending through the outer tube. The bearings and bushing cooperate to permit longitudinal movement of the inner tube within the outer tube but prevent relative lateral and rotational movement of the tubes. By this construction, a seat suspension system can be constructed with standard readily available materials and without costly manufacturing procedures yet will provide a highly functional and reliable product.

7 Claims, 5 Drawing Sheets

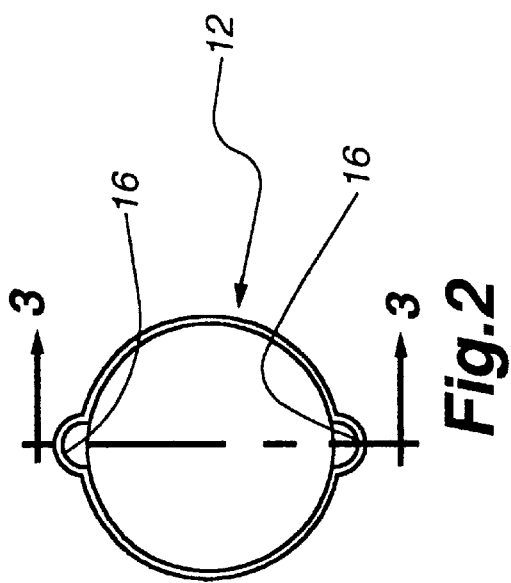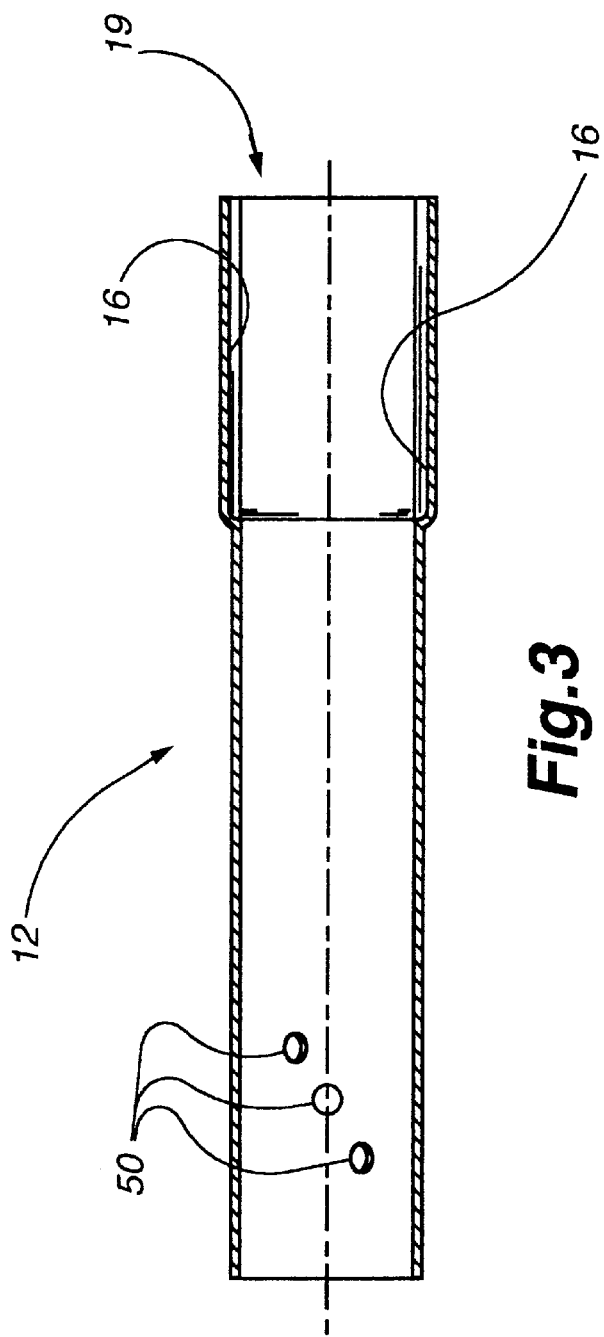

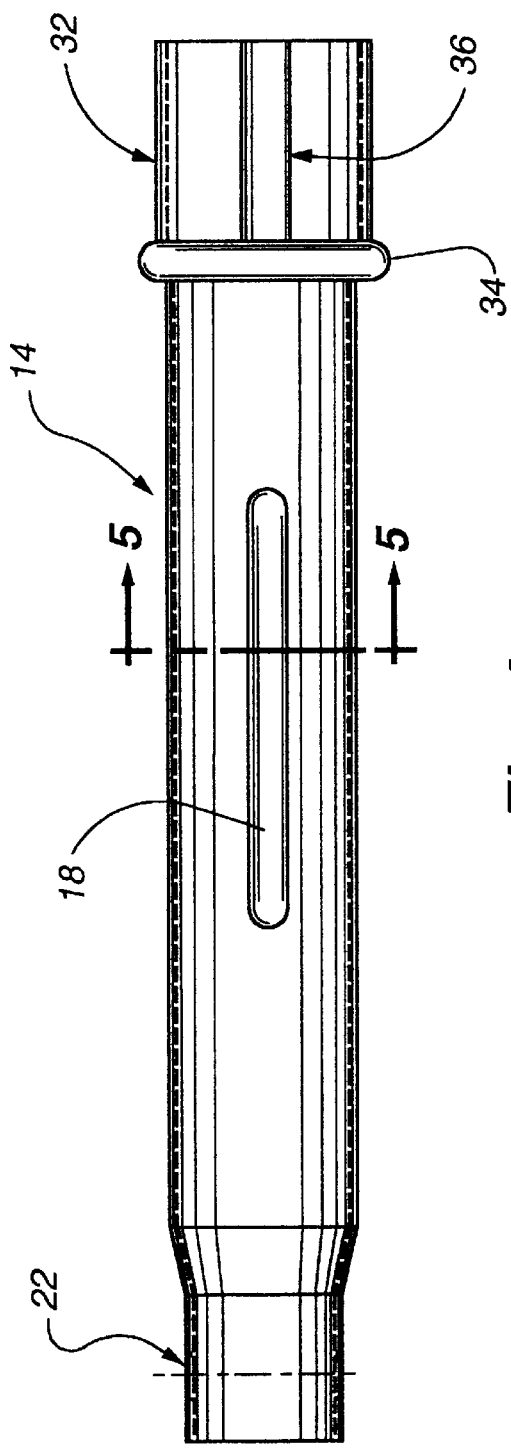
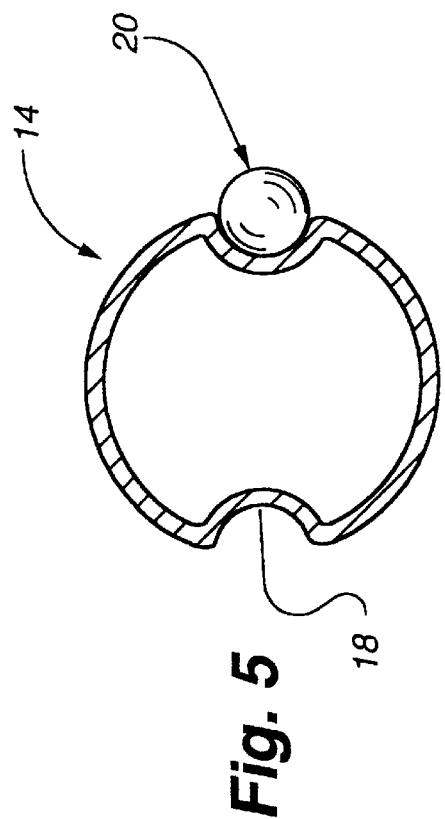
Fig. 4
Fig. 5

BICYCLE SEAT SUSPENSION SYSTEM

BACKGROUND OF THE INVENTION

1. Field of the Invention

The present invention relates generally to a seat suspension system for a bicycle and, more particularly, to a seat suspension system which provides superior shock absorbing characteristics while being reliably designed and low in cost to manufacture.

2. Description of the Prior Art

The standard construction of a typical low-cost bicycle includes a rigid frame supported on a pair of wheels having relatively small profile pneumatic tires. A complaint of such construction is that the bicycle is incapable of absorbing shock experienced when riding over irregular surfaces. The tires are generally capable of absorbing only minimal shock. Thus, much of the shock experienced in riding is transferred directly to the rider, which can be uncomfortable particularly when riding over extended periods of time. Moreover, many riding enthusiasts in recent times prefer to ride in off-the-road environments using a bicycle known as a mountain bike. Such riding conditions typically involve very rough terrain, and the shock experienced by the rider can be considerable.

Attempts have been made to improve bicycle riding comfort by incorporating various suspension systems in the design of the bicycle frame. Such systems may include for example, a shock absorbing rear suspension system involving pivoting rear chain stays or swing arms. However, such systems are expensive to make and add considerably to the cost of the bicycle. Thus, it is generally the case that these systems are only available in expensive, high-end bicycles. As a result, a considerable need exists for improvement in riding comfort of relatively inexpensive or low-end bicycles which are used primarily for casual pleasure riding.

Much of the shock experienced in the bicycle riding is transferred to the rider through the bicycle seat which generally supports the bulk of the rider's weight. To improve riding comfort, seats have been designed with added padding. However, such padding can interfere with the movement of the rider's thighs while pedaling, requiring extra effort on the part of the rider. Forms of seat suspension systems are known in which the seat is supported by a compression spring arrangement and suitably fitted into the seat tube of the bicycle frame such that the compression spring can absorb shocks transferred to the seat. These systems can be highly effective in improving riding comfort. One such system is disclosed, for example, in U.S. Pat. No. 5,044,648 issued Sep. 3, 1991 to Knapp.

A known disadvantage of seat suspension systems involving a seat tube compression spring arrangement is that even though these systems are less expensive than rear frame suspension systems they still are very costly to construct and are available only on expensive high-end bicycles or as a costly after-market accessory. Such known systems typically require the use of expensive materials, custom made parts and close-tolerance manufacturing techniques. This can be appreciated from reference to the aforementioned Knapp patent wherein the construction disclosed therein is seen to involve numerous metal cutting, milling and threading operations to achieve a functional product. As a consequence of their high cost, these systems are currently not used by original equipment manufacturers of relatively low-end bicycles.

Accordingly, it is desirable to provide a seat suspension system for a bicycle which is low in manufacturing cost and thus can be made available for use in low-end bicycles. Still further, it is desirable to provide such a system which is reliably designed as to function acceptably over the normal life of a bicycle.

SUMMARY OF THE INVENTION

The present invention overcomes the disadvantages of the prior art by providing a seat suspension system for a bicycle comprising an outer generally elongate hollow tube and an inner generally elongate hollow tube telescopingly received within the outer tube. Ball bearing races are provided as by metal forming in the inner and outer tubes, and ball bearings are disposed in the races. The inner tube has an inner end fitted with a bushing such that the bushing is slidingly engaged with the outer tube. A compression spring is disposed between the inner end of the inner tube and a stop pin extending through the outer tube. The bearings and bushing cooperate to permit longitudinal movement of the inner tube within the outer tube but prevent relative lateral and rotational movement of the tubes. By this construction, a seat suspension system can be constructed with standard readily available materials and without costly manufacturing procedures yet will provide a highly functional and reliable product.

BRIEF DESCRIPTION OF THE DRAWINGS

The foregoing and other novel features and advantages of the invention will be better understood upon a reading of the following detailed description taken in conjunction with the accompanying drawings wherein:

FIG. 2 is an end view of the outer tube of the suspension system assembly;

FIG. 3 is a sectional view taken substantially along the line 3—3 of FIG. 2;

FIG. 4 is a side view of the inner tube of the suspension system assembly;

FIG. 5 is a sectional view taken substantially along the line 5—5 of FIG. 4;

DETAILED DESCRIPTION OF THE PREFERRED EMBODIMENTS

Figure 1:
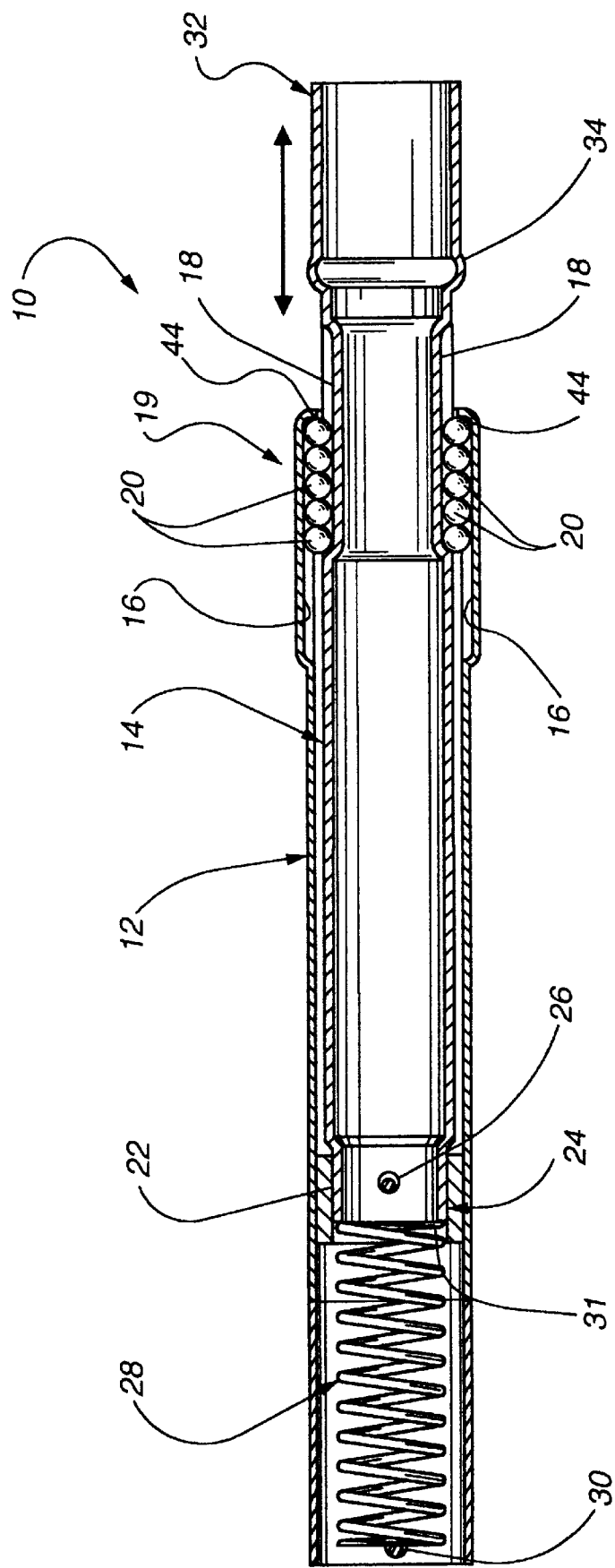
FIG. 1 is a side sectional view of a bicycle seat suspension system constructed according to the principles of the invention.

Referring now to the drawings, and initially to FIG. 1, a seat suspension system for a bicycle is shown in assembled form designated generally by the reference numeral 10. The assembly 10 includes as its principal components an outer, generally elongate hollow tube 12 and an inner generally elongate hollow tube 14. Both tubes 12 and 14 are preferably round in crosssection and are formed from welded seamed steel tubing of a type well-known in the art, although use of seamless tubing and various metal alloy materials are equally possible. As best seen in FIGS. 1–3, the outer tube 12 is formed, as will be described hereinafter, with a pair of longitudinal, opposed ball bearing races 16 at an upper end 19 thereof.

The inner tube 14 is likewise formed with a complementary pair of races 18. Ball bearings 20 are disposed in the races 16 and 18. Although five ball bearings 20 are illustrated in FIG. 1 in each pair of races 16 and 18, the invention is not limited to any particular number of ball bearings. Also, although two pair of opposed races 16 and 18 are illustrated, the assembly 10 may have additional races if desired.

Referring to FIGS. 1 and 4, the inner tube 14 can be seen to include a lower necked-down end 22. An annular nylon bushing 24 is fitted to the end 22 and secured by a transverse pin 26. A compression spring 28 abuts the end 22 of the tube 14 and is retained within the outer tube 12 by a transverse stop pin 30. The bushing 24 extends past the end 22 of the inner tube 14 thus providing a recess 31 for retaining the spring 28 in alignment with the tube end 22. At the other end 32 of the inner tube 14, a circular bead 34 and a longitudinal bead 36 are provided. The end 32 is received by a suitable clamp of a bicycle seat assembly (not shown) whereby the beads 34 and 36 serve to properly locate the seat. The end 32 may also be provided with an integral clamp (not shown) in a manner known in the art.

Figure 7:
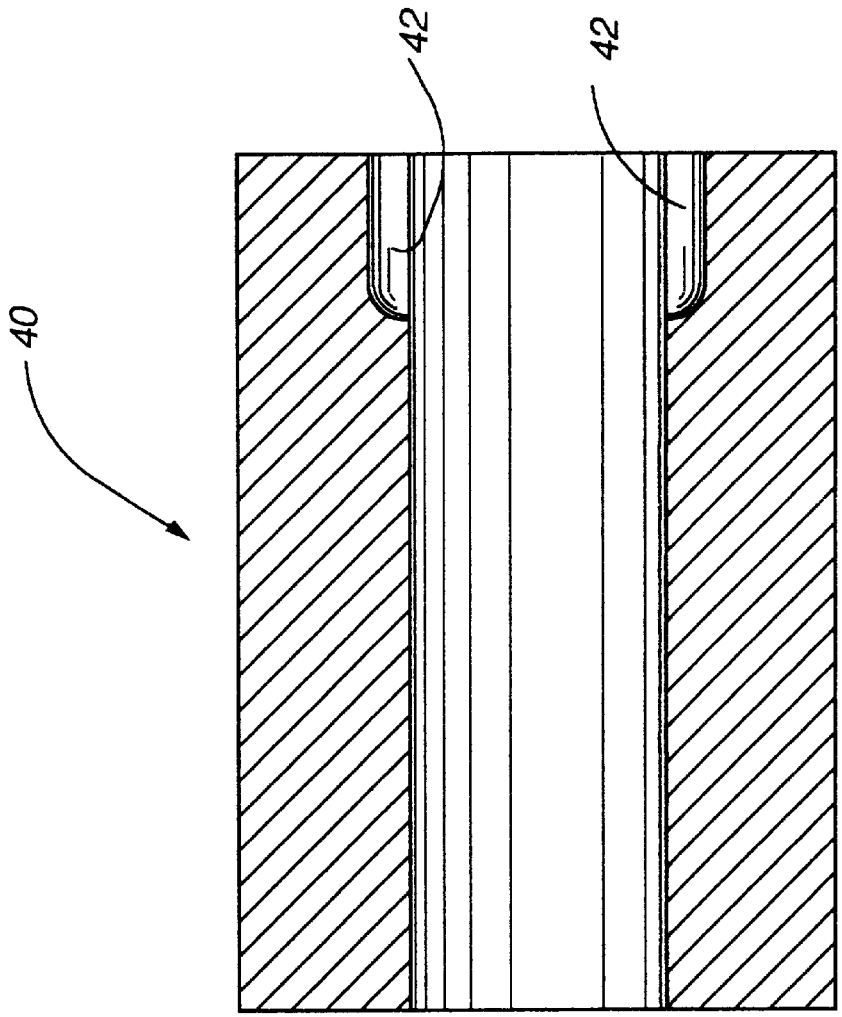
FIG. 7 is a side sectional view of the die taken substantially along the line 7—7 of FIG. 6.
Figure 6:
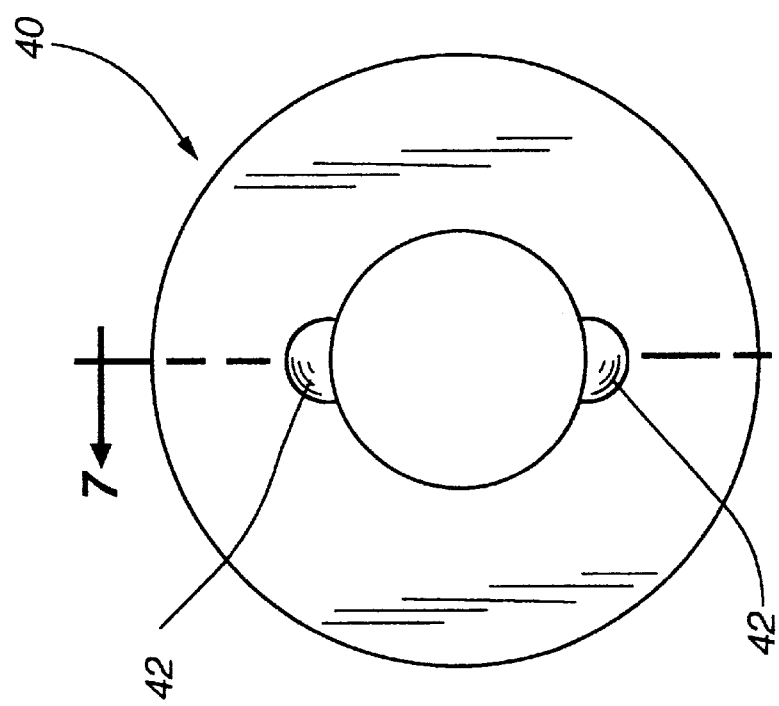
FIG. 6 is an end view of a forming die used to construct the assembly.
Figure 8:
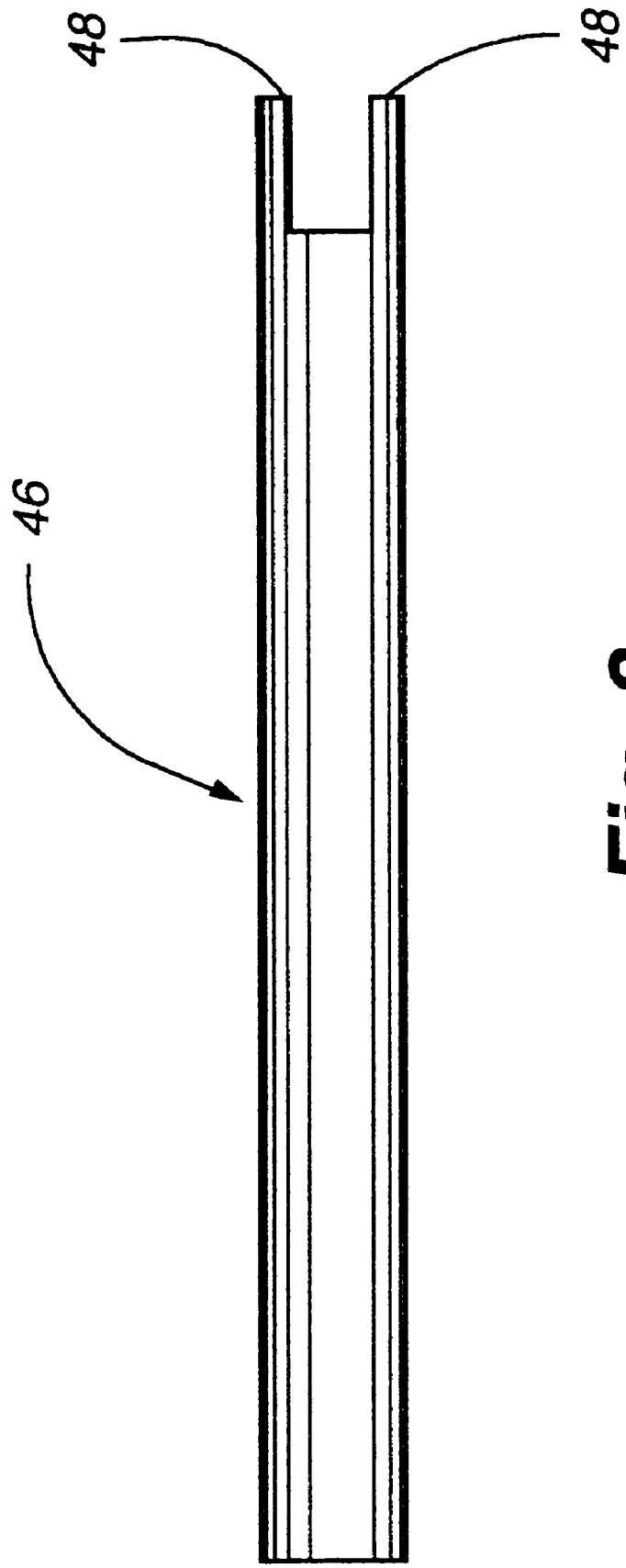
FIG. 8 is a side view of a spring insertion tool for construction of the assembly.

Construction of the suspension system assembly 10 can be seen to be readily accomplished by first forming the outer tube 12 with the races 16 using a suitable mandrel and driving the mandrel into the end of the tube 12. Next, the inner tube 14 is formed with a die and mandrel to comprise the races 18, the necked-down end 22 and the beads 34 and 36. The tube 14 with bushing 24 installed is then inserted into the tube 12 and the ball bearings 20 are placed in the races 16 and 18, Then, in accordance with the invention, a suitable die 40, such as illustrated in FIGS. 6 and 7 is placed over the tubes 12 and 14 and forced against the outer tube races 16 whereupon closed recesses 42 of the die 40 crimp and close the ends of the races 16, creating rounded ends 44 as shown in FIG. 1. After this operation, the tubes 12 and 14 are prevented from being separated and the ball bearings 20 are confined within the races 16 and 18. Next, the spring 28 is inserted and compressed by a suitable tool 46, as illustrated in FIG. 8. The tool 46 has tines 48 which engage the spring 28 but permit the pin 30 to be inserted retaining the spring 28 in place. A suitable accordion-like rubber boot (not shown) may be installed between the upper ends of the tubes 12 and 14 to protect the internal components of the assembly 10 from contamination by water or foreign matter. The assembly 10 is then ready to be clamped in position in the seat tube of a bicycle frame whereupon the seat can be installed.

In the construction of the inner and outer tubes 12 and 14 it is preferable to heat treat or case harden the bearing races 16 and 18 so that they can acceptably withstand the forces present during normal use of the assembly 10. The tubes 12 and 14 may also be chrome plated to enhance hardness of the races 16 and 18. Because the seat tube of a typical bicycle frame forms an angle of usually 69 to 74 degrees from horizontal, a considerable lateral component of force can act on the bearings 20. Thus, the races 16 and 18 will have a longer performance life if suitably hardened. Also, as best seen in FIG. 3, the outer tube 12 may be provided with a series of apertures 50 for selectively receiving the stop pin 30 in one of several longitudinal positions. In this way the spring 28 may be preloaded to any one of several conditions making the assembly 10 adjustable for differing weights of the bicycle rider.

It can now be appreciated that the seat suspension system 10 of the present invention provides a highly economical assembly in contrast to prior art devices. The assembly 10 is constructed by relatively low cost metal forming techniques, such as pressing and swaging. This is in contrast to prior art assemblies made by machining and metal removal operations such as milling, cutting and threading. Also, the assembly 10 need not be constructed with close tolerances. For example, the inner tube 14 may have any suitable inner or outer diameter so long as it is capable of being telescopingly received within the outer tube 12 and the bearing races 18 and tube end 22 are properly formed. This is so because it is the nylon bushing 24 which properly aligns and stabilizes the inner tube 14. Moreover, both pins 26 and 30 can be of a well-known expandable spring roll-pin type and thus the apertures through which they extend need not be held to close tolerances. Even further, the races 16 and 18 may be formed without holding close tolerances because if the bearings 20 are too loose after assembly, the outer tube 12 can simply be ovaled slightly, as with a vise, to tighten up the bearings 20 as desired. Likewise, the bearings 20 can be loosened if they are too tight. A further economical feature of the assembly 10 is the need for only a simple die 40, as disclosed, for crimping the races 16 closed. This construction functions acceptably to hold the assembly 10 together without the need as known in the art to thread the outer tube and use a cap of some type. Moreover, the bushing 24, which does not experience significant lateral forces, can be of relatively low-cost material such as nylon, unlike other systems known in the art. In addition, because the bushing does not perform any keying function, as is done in prior art systems, it can be a simple annular member and does not have a complex shape. The use of a coil spring 28, instead of known elastomer springs, allows for the use of a simple pin 30 to retain the spring 28 in position. A pin would ordinarily not support as elastomer spring in an acceptable manner. Moreover, the adjustable spring 28 preload feature is accomplished without known complex mechanisms by the simple use of alternative pin 30 positions.

It can also be appreciated that despite its simplicity the assembly 10 is highly functional and rugged in performance. The tight keying of the tubes 12 and 14 by the bearings 20 alone prevents undesirable twisting of the bicycle seat during use without the need for specially shaped inner tubes. In addition, the fact that the bearing races 16 are pressed outwardly of the tube 12, as opposed to being internally milled for example, allows the inner tube 14 to have a relatively large diameter. This contributes to the strength and stiffness of the inner tube and thereby avoids using a heavier, machined solid rod or the like. A further important feature of the invention is the bead 36 of the inner tube end 32. As best seen in FIG. 4, the bead 36 is oriented in alignment with one of the races 18 of the inner tube 14. Thus, the bead 36 will cooperate with a standard slot of well-known bicycle seat clamps to essentially position the seat relative to the assembly 10 in only one orientation. In this predetermined orientation, the races 16 and 18 will necessarily be oriented fore-to-aft of the bicycle seat tube and, because of the standard angle of the seat tube, the lateral forces acting between the inner and outer tubes 12 and 14 will be directed centrally of the bearing races 16 and 18, as opposed to acting sideways on the races 16 and 18.

While the present invention has been described in connection with preferred embodiments thereof, it will be apparent to those skilled in the art that many changes and modifications may be made without departing from the true spirit and scope of the invention. Accordingly, it is intended by the appended claims to cover all such changes and modifications as come within the true spirit and scope of the invention.

What is claimed is:

1. A seat suspension system for a bicycle comprising:
    an outer generally elongate tube having a first end formed with at least two ball bearing races running longitudinally and on opposite sides of said tube, said races projecting outwardly of said tube;

an inner generally elongate tube having a first end and a second end, said inner tube telescopingly received within said outer tube, and said first end formed with ball bearing races aligned in registry with the ball bearing races of said outer tube;

a plurality of ball bearings disposed between the respective races of the inner and outer tubes; and a compression spring disposed between said second end of the said inner tube and a stop provided in said outer tube;

wherein said ball bearings are configured to permit longitudinal movement of said inner tube within said outer tube while preventing lateral and rotational movement of said inner tube within said outer tube and wherein the diameter of said inner tube is maximized by said outward forming of said outer tube races.

2. The seat suspension system of claim 1 wherein said second end of said inner tube is necked down to receive a bushing.

3. The seat suspension system of claim 2 wherein said bushing is secured to said inner tube by a transverse pin positioned through said bushing to fix the position of said bushing with respect to said inner tube.

4. The seat suspension system of claim 2 wherein said bushing is an annular member which is fitted over said necked-down portion.

5. The seat suspension system of claim 1 wherein said first end of said inner tube includes an outwardly projecting longitudinally directed bead for cooperation with a clamp of a bicycle seat and said bead is aligned on said inner tube with one of said races.

6. The seat suspension system of claim 1 wherein said stop comprises a pin extending transversely of said outer tube.

7. The seat suspension system of claim 6 wherein said pin is adjustable between plurality of apertures formed in the outer tube in alternative positions to thereby permit selective preloading of said spring.

* * * * *